US000002044P3

(19) United States

(12) Statutory Invention Registration (10) Reg. No.: US H2044 H

Faughey et al. (43) Published: Sep. 3, 2002

(54) CONTAINER WITH RETAINING MEMBER

(75) Inventors: Michael Faughey, Harleysville; Daniel A. Backich, Churchville, both of PA (US); M. Simon Freed, North Brunswick, NJ (US); Brian J. Brozell, Maumee, OH (US)

(73) Assignee: McNeil-PPC, Inc., Skillman, NJ (US)

(21) Appl. No.: 09/183,963

(22) Filed: Nov. 2, 1998

(51) Int. Cl.[7] ..... B65B 1/04

(52) U.S. Cl. ..... 141/22; 222/420

(58) Field of Search ..... 141/22, 23, 24; 604/212, 213, 215, 217; 222/420; 215/228

(56) References Cited

U.S. PATENT DOCUMENTS

| | | | | | |
|---|---|---|---|---|---|
| 2,877,810 | A | * | 3/1959 | Zackheim | 141/22 |
| 2,968,423 | A | | 1/1961 | Mahler et al. | 222/49 |
| 2,989,215 | A | | 6/1961 | Willingham | 222/207 |
| 3,101,751 | A | | 8/1963 | Ballin | 141/24 |
| 3,141,579 | A | | 7/1964 | Medlock | 222/207 |
| 3,146,806 | A | * | 9/1964 | Ginsburg | 141/22 |
| 3,233,797 | A | | 2/1966 | Conry | 222/477 |
| 3,321,113 | A | | 5/1967 | Conry | 222/477 |
| 3,543,964 | A | | 12/1970 | Schlossmacher | 222/41 |
| 3,558,022 | A | | 1/1971 | Zytko | |
| 4,143,794 | A | | 3/1979 | Stratford et al. | 222/42 |
| 4,143,797 | A | | 3/1979 | Reed | 222/207 |
| 4,185,755 | A | | 1/1980 | Sachs et al. | 222/43 |
| 4,211,346 | A | | 7/1980 | Mehra et al. | 222/205 |
| 4,243,157 | A | | 1/1981 | Rettberg | 222/44 |
| 4,407,435 | A | | 10/1983 | Harmon | 222/481 |
| 4,427,041 | A | | 1/1984 | Coetzee | 141/294 |
| 4,433,799 | A | | 2/1984 | Corsette | 222/309 |
| 4,454,964 | A | | 6/1984 | Sacher | 222/43 |
| 4,474,312 | A | | 10/1984 | Donoghue | 222/205 |
| 4,607,762 | A | | 8/1986 | Zulauf et al. | 222/48 |
| 4,627,454 | A | | 12/1986 | Dahm | |
| 4,684,046 | A | | 8/1987 | Foster et al. | 222/451 |
| 4,747,521 | A | | 5/1988 | Saffron | 222/205 |
| 4,871,092 | A | | 10/1989 | Maerte | 222/153 |
| 4,936,490 | A | | 6/1990 | Battegazzore | 222/205 |
| 5,000,353 | A | | 3/1991 | Kostanecki et al. | 222/207 |
| 5,044,521 | A | | 9/1991 | Peckels | 222/23 |
| 5,050,782 | A | | 9/1991 | Cheng | 222/309 |
| 5,054,656 | A | | 10/1991 | Lasner | 222/158 |
| 5,067,638 | A | | 11/1991 | Bavaveas | 222/205 |
| 5,078,289 | A | | 1/1992 | Bolton et al. | 215/228 |
| 5,119,971 | A | | 6/1992 | Reyman | 222/129 |
| 5,127,553 | A | | 7/1992 | Weinstein | 222/158 |
| 5,154,702 | A | | 10/1992 | Foyil | 604/212 |
| 5,174,478 | A | | 12/1992 | Reyman | 222/207 |
| 5,228,586 | A | | 7/1993 | Fuchs | 222/38 |
| 5,251,792 | A | | 10/1993 | Sheen | 222/205 |
| 5,259,536 | A | | 11/1993 | Reyman | 222/207 |
| 5,261,569 | A | | 11/1993 | Sandwell | 222/205 |
| 5,330,081 | A | | 7/1994 | Davenport | 222/207 |
| 5,363,991 | A | | 11/1994 | Reyman | 222/207 |
| 5,363,992 | A | | 11/1994 | Meshberg | 222/309 |
| 5,392,966 | A | | 2/1995 | Bunin | 222/454 |
| 5,484,070 | A | | 1/1996 | Graham | 215/223 |
| 5,497,915 | A | | 3/1996 | Wass | 222/153.07 |
| 5,551,607 | A | | 9/1996 | DeJonge et al. | 222/505 |
| 5,584,420 | A | | 12/1996 | Awada et al. | 222/153.09 |
| 5,636,765 | A | | 6/1997 | DeJonge | 222/107 |
| 5,669,530 | A | | 9/1997 | Cichon et al. | 222/153.09 |
| 5,695,093 | A | | 12/1997 | Lucius | 222/129 |
| 5,746,349 | A | | 5/1998 | Putteman et al. | 222/49 |
| 5,769,278 | A | | 6/1998 | Kummer et al. | 222/158 |
| 5,833,124 | A | | 11/1998 | Groves et al. | 222/158 |

FOREIGN PATENT DOCUMENTS

| | | |
|---|---|---|
| GB | 1276859 | 6/1972 |
| WO | WO 9623486 A | 8/1996 |

* cited by examiner

*Primary Examiner*—Steven O. Douglas

(74) *Attorney, Agent, or Firm*—Michele G. Mangini; Joseph Leightner

(57) ABSTRACT

Containers a retaining member disposed within the container which substantially obstructs the opening of the container are disclosed. In a preferred embodiment, the member enlarges to receive a dispensing instrument that is used to cap the container.

11 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTAINER WITH RETAINING MEMBER

FIELD OF THE INVENTION

The present invention relates a container, in particular, a container particularly well suited for dispensing medications.

BACKGROUND OF THE INVENTION

Many containers are known for delivering prescription medications. These containers are typically made from an appropriate polymer or glass material. Depending on the physical state of the medication to be dispensed, i.e., solid or liquid, the container contains appropriate safeguards against tampering, and child-resistant opening mechanisms which prevent child access to the contents of the container.

Also contained in many containers for dispensing medications to children are dispensing instruments such as droppers. The dispensing instruments are immersed in the liquid contained in the container and the medication is drawn up into the dispensing instrument and dispensed to the child. These containers and dispensing instruments combinations frequently contain child resistant opening means, such as containers that require the squeezing of the cap or alignment of arrows or tabs. Others have attempted to restrict access to the contents of the container by a hinged mechanism, as disclosed in U.S. Pat. No. 4,132,334. However certain pharmaceutical compositions are viscous and sticky which after multiple applications renders the hinged element inoperative. However if the cap is improperly reapplied or not attached there is the potential for a child to overdose on the contents of the container. In addition, people frequently fail to read and follow directions such that instead of using the appropriate dispensing instrument, such as a dropper, an improper dispensing instrument such as a teaspoon, cup etc. would be used to provide a dosage to a patient, which might cause an overdose situation.

It would be highly desirable that the container be designed to prevent the overdosing of a patient. Preferably the container would also facilitate the use of the proper dosage means, preferably by conveniently incorporating and storing the dosing means with the package.

SUMMARY OF THE INVENTION

In a first embodiment, the invention comprises a container for holding liquids, said container having an opening, and a retaining member which substantially obstructs said opening of said container, said retaining member integrally including a biased passageway which enlarges to receive a dispensing instrument, and closes after removal of dispensing instrument.

Another embodiment of the invention provides a combination comprising a container for holding liquids, a dispensing instrument, a retaining member such that it substantially obstructs said opening of said container, said member including a biased passageway which enlarges to receive said dispensing instrument, and closes after removal of said dispensing instrument, and a liquid containing a pharmaceutically active ingredient.

These and other embodiments of the invention will become apparent when reviewing the drawings and specification.

DETAILED DESCRIPTION OF THE PREFERRED EMBODIMENTS

The invention together with the above and other objects may best be understood from a consideration of the following detailed description of an illustrative embodiment in the course of which reference is made to the accompanying drawings.

DETAILED DESCRIPTION OF THE INVENTION

Figure 1:
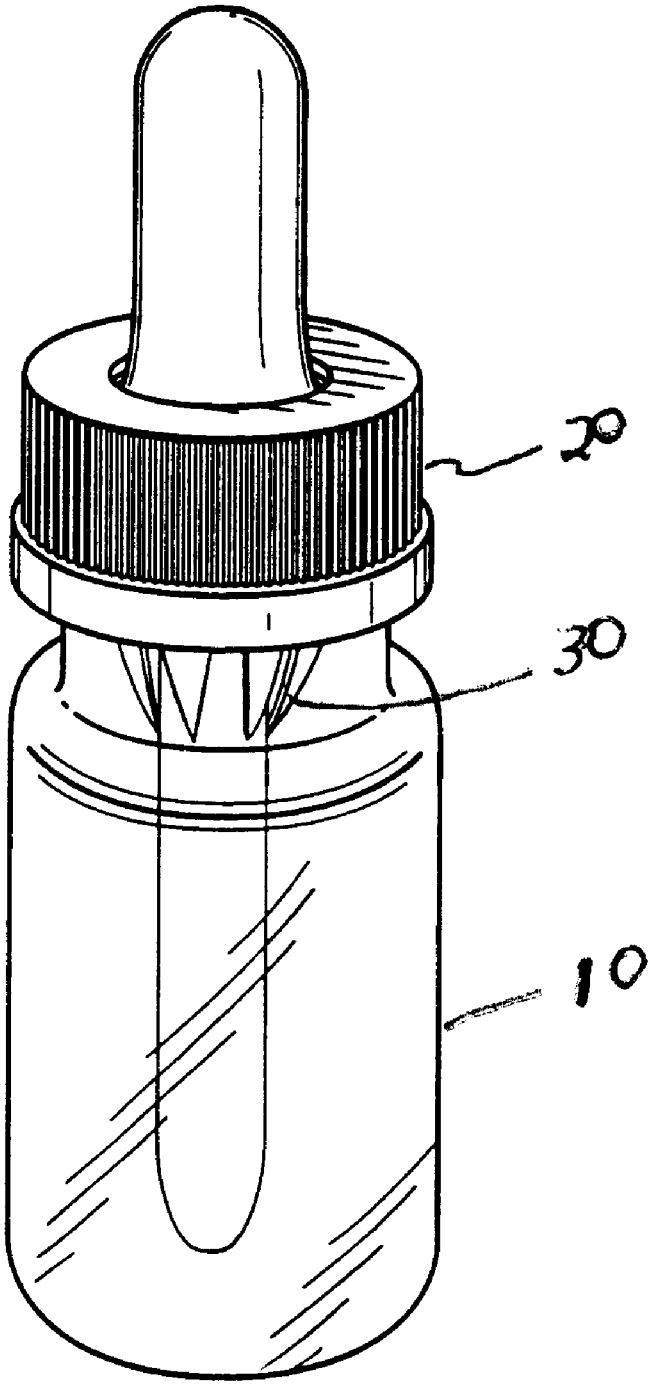
FIG. 1 is a perspective view of the container and member disposed within container and the dispensing means.

Referring to FIG. 1 an embodiment of the present invention is provided with the container 10, the dispensing instrument 20 and the retaining member 30 depicted. The dispensing instrument is threaded onto the top of the container so as to close the container and prevent the liquid from escaping. As can be seen in this figure, the dispensing instrument passes through the retaining member, radially expanding the petals of the retaining member.

Figure 2:
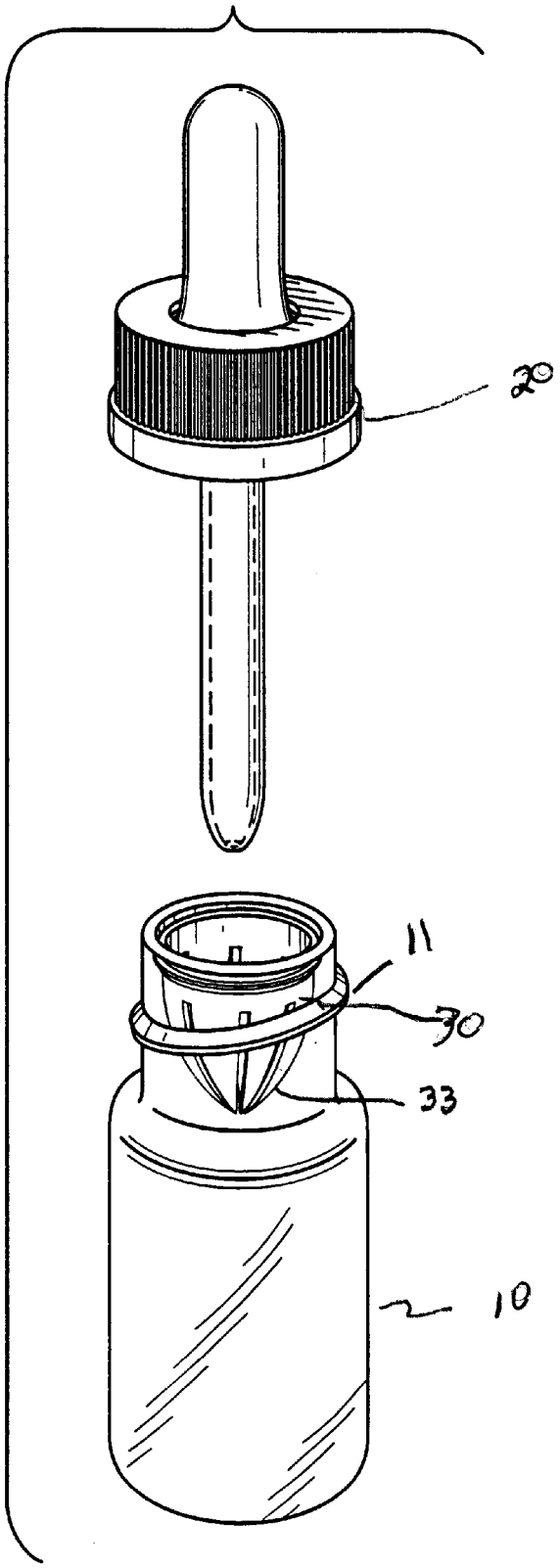
FIG. 2 is an exploded perspective view thereof the container, retaining member disposed within the container and dispensing instrument removed from the container.

FIG. 2 depicts the same elements in an exploded perspective view. The threads on the container 11 are now visible. The retaining member 30 is now in a closed position, the petals 33 are biased so that upon the removal of the dispensing instrument 20 the retaining member closes, substantially preventing the removal of liquid from the container.

Figure 3:
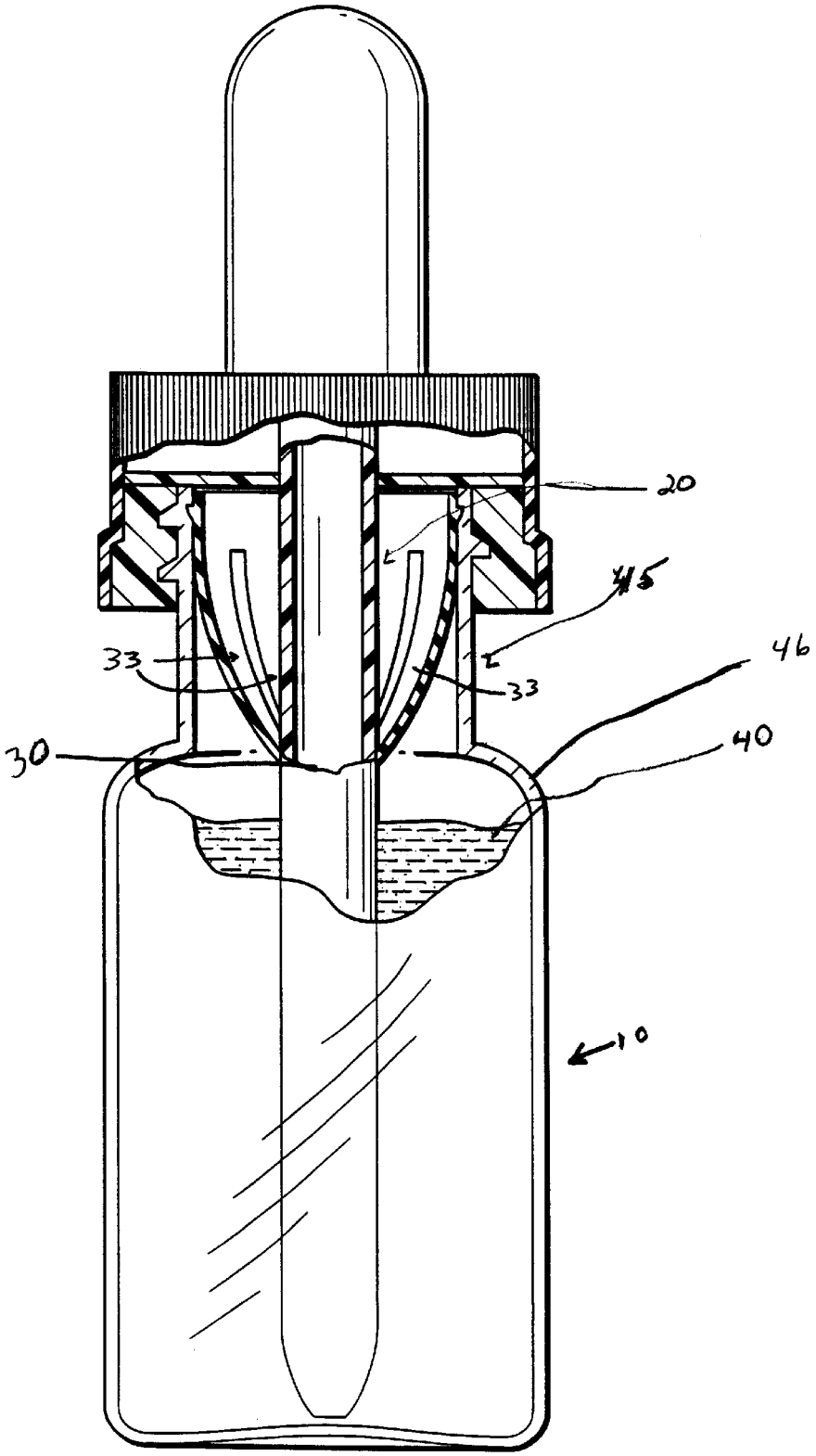
FIG. 3 is a partial cross-sectional view of the container, retaining member disposed in the container and the dispensing instrument.

FIG. 3 provides a cross-sectional view of the combination of elements in a preferred embodiment as a consumer would first purchase the article. The container 10, dispensing instrument and retaining member are all visible as well as the initial liquid level 40 in the container. Note that the retaining member is contained within the neck 45 (substantially vertical area) and shoulder 46 (radius of curvature) of the container thereby allowing any liquid to drain from the retaining member. The base or wide portion of the retaining member is adjacent to the exit of the container, while the narrow end of the retaining member is closer to the liquid level of the container. The liquid level of the container as initially filled is below the lowest point of the retaining member 30. The individual petals 33 of the retaining member 30 are also visible.

Figure 4:
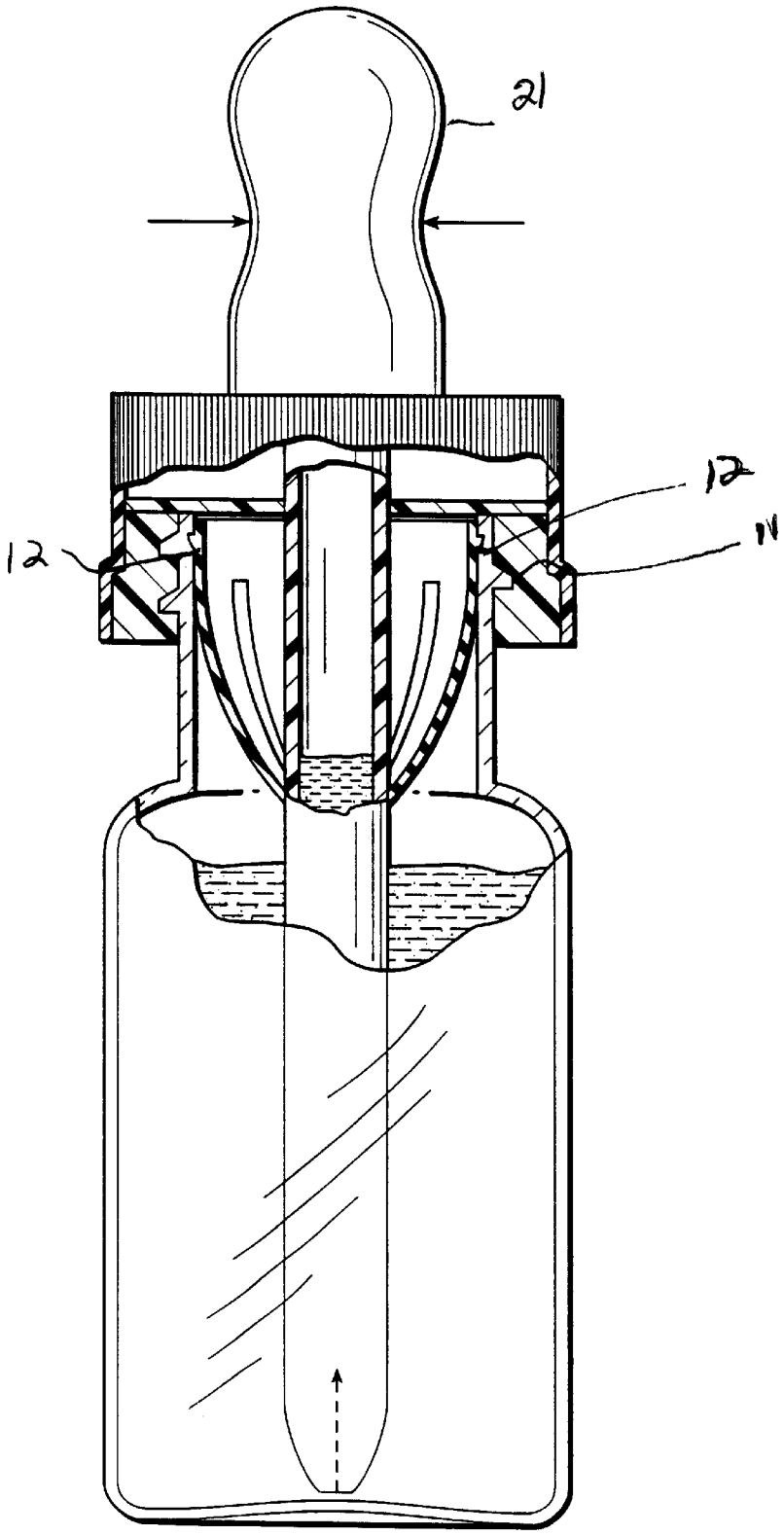
FIG. 4 is a partial cross-sectional view of the container, member disposed in the container and dispensing means with the bulb on said dispensing instrument depressed.

FIG. 4 depicts the bulb 21 on the dispensing instrument being depressed thereby drawing liquid from the container into the dispensing instrument. As is apparent from the figure the liquid level in the dispensing instrument is above the liquid level of the container. A clip 12 on the retaining member 30 holds the retaining member in place in the passageway of the container. Alternative embodiments of holding the retaining member in place include a shoulder in which the retaining member is placed, adhesives, joining the containing and retaining member by heat or other energy sources. Alternatively, since the retaining member is made of a resilient material the retaining member can be held in place by compressive forces.

Figure 5:
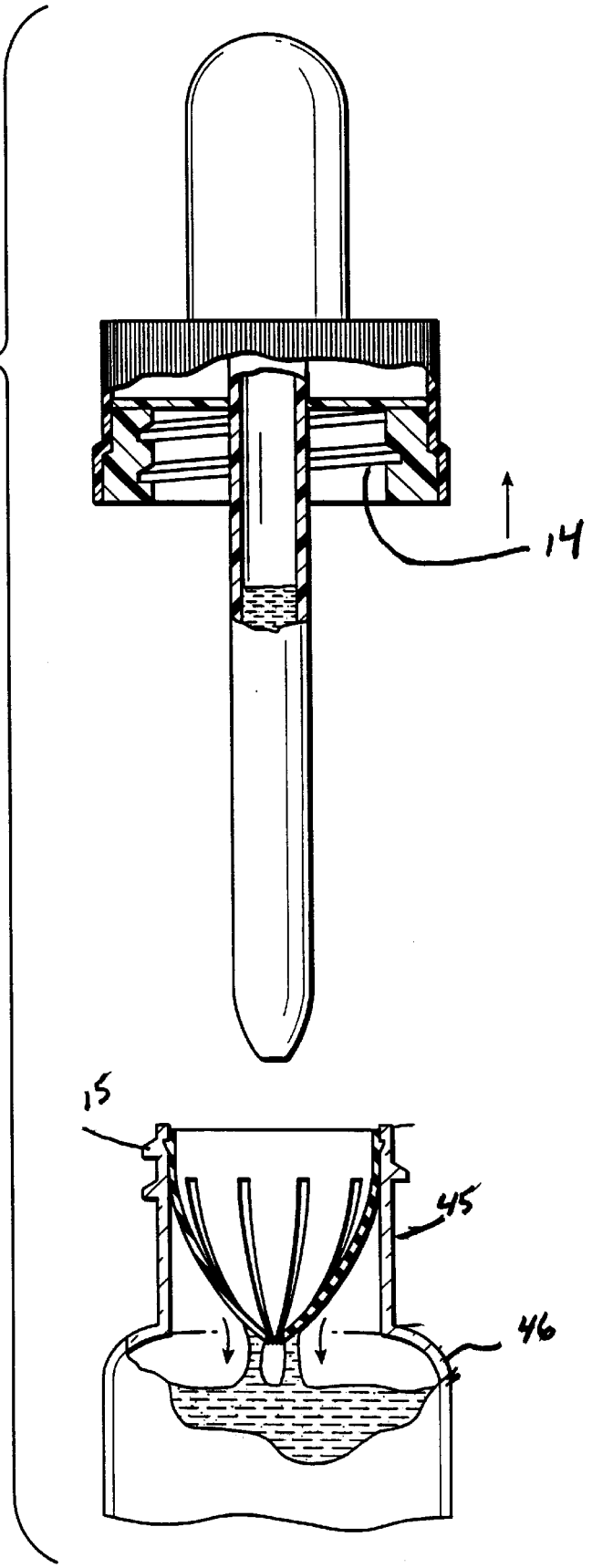
FIG. 5 is an exploded cross-sectional view of the dispensing means removed from the container and the retaining member disposed within the container is in the closed position.

FIG. 5 displays the dispensing instrument removed from the container. The dispensing instrument contains the liquid within the container. Residual liquid adhering to the outer surface of the dispensing instrument is removed by the compressive forces of the retaining member upon the dispensing instrument. The retaining member is comprised of resilient material with sufficient resiliency and memory to close upon the dispensing instrument as it is been inserted and withdrawn. These compressive forces remove liquid from the outside of the dispensing instrument upon the withdrawal of the dispensing instrument from the container and allow any volumetric graduations on the dispensing instrument to be read.

The threads on the radial edges of the dispensing instrument 14 are also visible. The compliant engaging threads on the container are visible 11. While the retaining member is closed, any excess liquid drains from the opening of the retaining member.

Figure 6:
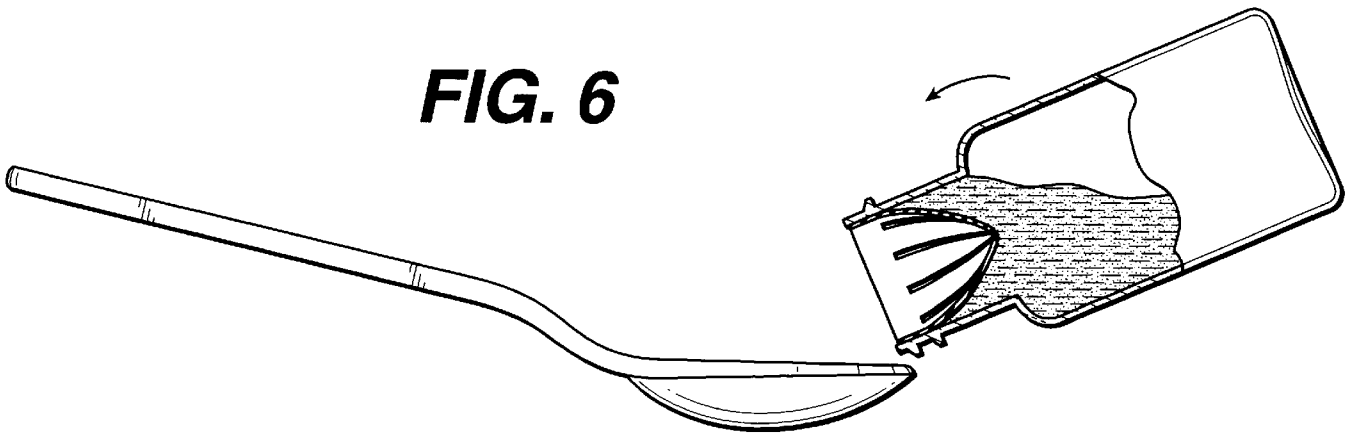
FIG. 6 is a side view in partial section showing the container and retaining member within the container in a tilted position.
Figure 7:
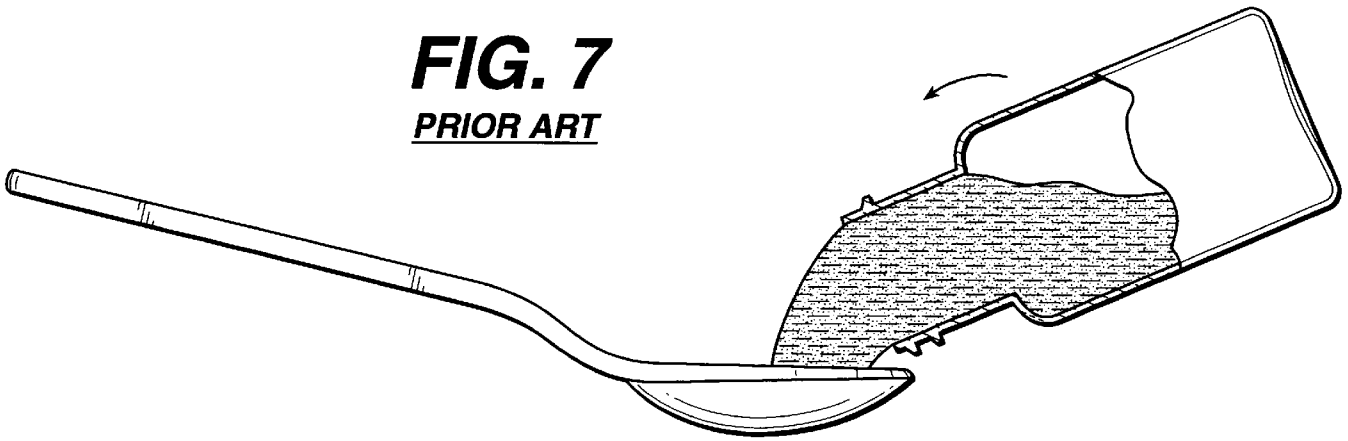
FIG. 7 PRIOR ART
FIG. 7 is a side view of the prior art container in a tilted position.

FIG. 6 depicts the principle advantage of the present invention, the restriction of the flow of liquid from the container. The retaining member substantially prevents the flow of liquid from the container when the dispensing instrument is not used. The prior art bottle is depicted in FIG. 7 which allows unlimited ability to pour the contents of the container into an unsuitable dispensing instrument.

This problem of using the wrong dispensing agent and overdosing the patient is not limited to children who access the contents of the container, but also to adults who fail to read and follow label instructions. It is possible that a parent could assume that he or she knows the proper dosage and does not follow the label's instructions. The present invention makes it very difficult, if not impossible, to have a substantial amount of liquid to be dispensed without using the proper dispensing instrument. Furthermore, the difficulty of dispensing the liquid from the container without using the proper dispensing agent provides motivation to a parent to review the label directions to learn the proper dosage.

Figure 8:
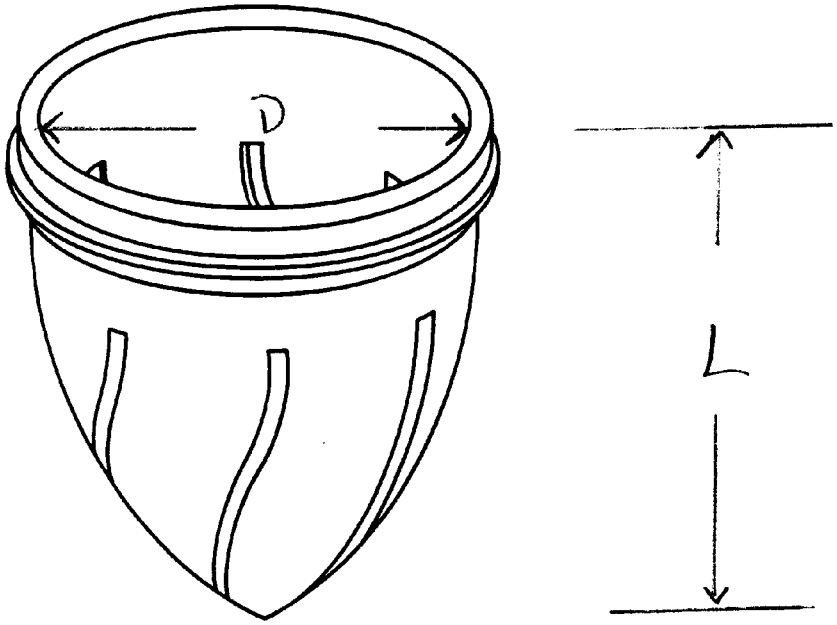
FIG. 8 is a perspective view of an alternative embodiment of the retaining member in the container.
Figure 9:
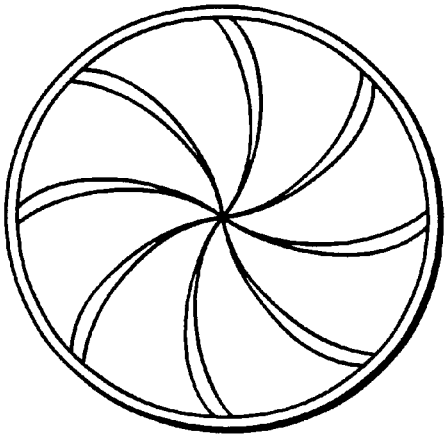
FIG. 9 is a bottom plan view of the alternative embodiment depicted in FIG. 8.

FIGS. 8 and 9 depict an alternative embodiment of the retaining member of the present invention. The slits in the retaining member are provided in a more circular fashion than in the other retaining members provided in the previous figures. The slits while more circular, the slits are not axially provided around the retaining member.

The container of the present invention is not limited by the materials of construction. Suitable materials include glass, polymeric materials such as polyethylene, including low density, linear low density and high density; polypropylene, polyethylene terephthalate, copolymers of these materials, combinations of these materials and the like. Most preferred are containers are made from polyethylene and glass.

The retaining member is made of a resilient material such as polyethylene, including low density, high density and linear low density; polypropylene, elastomeric materials including rubbers such as silicone rubber, polyethylene terephthlate, copolymers, combinations of these materials and the like. Most preferably the retaining member is made from low density polyethylene. It is important for the retaining member to be resilient to return to a closed position, i.e., a position in which the retaining member substantially prevents the liquid from being dispersed after the dispensing instrument is withdrawn. A further advantage of the resilient retaining member is that it can be used as a stand or resting spot for the dispensing instrument. The retaining member is preferably sufficiently resilient to hold the dispensing instrument and dosage in an upright position within the retaining member without the need for the dispensing instrument to extend through the retaining member. In other words, the retaining member is sufficiently strong to act as a cup or dish for the dispensing instrument. This allows a parent to draw the proper dosage into the dispensing means, then place it into the retaining member while preparing a child for dosing, while still being able to see the dosage in the dispensing instrument.

The dispensing instrument is made of materials similar to the container. Once again the preferred material is polyethylene. The dispensing instrument, is preferably an elongated hollow device, that is a member with a length greater than its width. The top of the dispensing instrument has a bulb, preferably made from a elastomeric material, attached to it such that when pressure is applied to the bulb it deforms. The deformation creates a vacuum effect which draws the liquid up into the hollow annular space. Preferably the dispensing instrument contains graduated markings to aid in determining the volume of fluid contained in the annular chamber. Dispensing instrument is a general term to describe any device used to transfer liquid from the container to a body part, for example mouth, nose, ear, eye and the like. The term is not limited in size and it also includes devices with tubes, barrels, cylinders, pipettes. It also includes all manners of drawing liquids into the dispensing instrument including squeeze bulbs, vacuum pumps, and mouth suction. It also includes all manner of expelling liquids from the dispensing instrument including gravity, squeeze of the bulb, forced air, and mouth blowing.

In a highly preferred embodiment of the invention the dispensing instrument is integrated into a cap for the container. The dispensing instrument contains threads or other suitable means which are compliant with the container to join the dispensing instrument/cap and the container. Alternative embodiments of the invention include a dispensing instrument which is not included in the cap, but is provided separately, for example, provided along the side of the container.

In a highly preferred embodiment of the invention the threaded dispensing means provide child resistant safety features. These features are well known to those with skill in the art. Suitable examples are disclosed in U.S. Pat. Nos. 3,795,338 and 3,857,505, the contents of which are incorporated by reference in their entirety. These patents and other similar embodiments known to those with skill in the art require pressure to engage projections extending upwardly from the walls of the container. In the absence of sufficient pressure the cap will ratchet over the projections, and not permit the cap to open. Other child resistant caps require pressure to be applied to the top or side of the cap in order to engage the projections to open the cap.

The present invention can be used to dispense any liquids, including solutions, dispersions and suspensions. Suitable pharmaceutically acceptable dispersants and suspending agents are well known in the art, see for example, *Remington Pharmaceutical Sciences*, $15^{th}$ Edition. Techniques for making such suspensions and dispersions are known to those with skill in the art, see for example, U.S. Pat. Nos. 5,272,137; 5,374,659; 5,409,907; 5,621,005; and 5,658,919; the contents of which are incorporated by reference.

In a preferred embodiment of the invention, the liquids provided in the container are viscous. The more viscous fluids are substantially unable to be removed from the container because of the retaining member. At most, only a small amount of liquid can be removed without the dispensing instrument. This provides a disincentive for the person attempting to remove fluid from the container to do so without the use of the appropriate dispensing means. Preferably the viscosity of the fluid containing the pharmaceutically active agent is from about 100 to about 3000 centipoise; more preferably from 300 about to about 2000 centipoise; and most preferably from about 500 to about 1600 centipoise. Even though these liquids are viscous the present invention allows the liquid in the container to drain from the retaining member when the dispensing instrument is withdrawn. As used herein, centipoise is measured after four minutes at a speed of 12 revolutions per minute using a Brookfield viscometer using a small (10 centimeters$^3$) sample cup, and a #3 spindle at room temperature (approximately 23° C.).

The design of the retaining means is specifically designed for viscous and sticky liquids. The liquids most preferably used in the present invention are infants' and children's cold remedies. Such remedies are typically very concentrated so that smaller volumes need to be delivered to the patient. The viscosity is such that the retaining means are provided with slits that are more than 50% of the longitudinal axis of the retaining means, preferably greater than 60% and most preferably more than 75% of the length of the retaining member (longitudinal axis), see FIG. 8. This allows any liquid which comes into contact with the retaining means to readily drain back into the container. If the liquid was unable to drain, there is a possibility of the retaining member being difficult to open or the possibly being left in the open position which would allow the liquid to be dispensed without the appropriate dispensing means.

The retaining means are provided with slits that allow the radial opening of the retaining member to a diameter of a predetermined value relative to the diameter of the dispensing instrument. The maximum radial opening of the retaining member is between about 1 and about 10% larger than the diameter of the dispensing instrument, preferably between about 2 and about 8 and most preferably between about 4 and about 6% larger than the diameter of the dispensing instrument. This controlled radial opening allows residual liquid to readily drain back into the container while providing adequate removal of excess liquid form the dispensing instrument and allowing the retaining member to sufficiently re-close.

Another advantage of the slitted design is to minimize the stresses in the petals. The petals are understood to be the individual elements within the retaining means which open and close with the insertion and withdrawal of the dispensing means. The present invention employs a plurality of petals, at least 5 petals, most preferably 8 petals. The increased number of petals improves the memory of the retaining means, that is the ability of the retaining means to retain its desired shape after repeated uses. The plurality of petals also improves the ability of the retaining member to remove any liquid from the side of the dispensing instrument, thereby making it easier to read and dispense the proper amount of liquid to the patient.

Another preferred embodiment of the retaining means is the length to diameter ratio. As stated above, the present invention is particularly well suited for use with infants' and children's viscous and sticky formulations. The length to diameter (L/D) ratio is generally less than about 3.5, typically from about 0.6 to about 3.0 and preferably from about 0.5 to about 1.2. In a most preferred embodiment the L/D ratio is about 1. The diameter is measured at the top of the conical portion of the retaining member, closest to the exit of the container. The interior and exterior diameters are understood to be substantially equal since the thickness of the retaining member is considered negligible. The preferred diameter is from about 1 to about 2 centimeters, preferably about 1.5 cm. The length is understood to be measured from the conical section to the tip of the petals when in the closed position. The length of the retaining member is preferably from about 1.25 to about 3 cm, most preferably about 2 cm. As used herein, the retaining member in the closed position is understood as not having a dispensing instrument inserted through the retaining member. See FIG. 8 for a depiction of the relative length to diameter. The low L/D ratio is an important advantage in that the retaining member is not immersed in the liquid for extended periods of time. In a highly preferred embodiment the retaining member is positioned above the normal liquid level of the container, preferably in neck region of the container, allowing excess liquid to drain from the retaining member back into the container, see FIG. 3, area denoted 45.

The present invention may be used to deliver many active medicaments that are well known in the art. U.S. Pat. No. 4,929,508 provides a suitable list of such medicaments and the relevant portions of the patent are hereby incorporated by reference. The form of the medicaments are not critical in the invention so long as they may be incorporated into a liquid. The original form of the pharmaceutically active ingredient before incorporation into the liquid may be solids, liquids, powders, pellets and the like.

Especially preferred medicaments to be delivered by the present invention include ibuprofen, acetaminophen, aspirin, pseudoephedrine, pseudoephedrine hydrochloride, chlorpheniramine maleate, dextromethorphan hydrobromide, diphenhydramine, loratadine, phenylpropanolamine and diphenydramine hydrochloride.

Commonly known pharmaceutically acceptable additives for orally-administered drugs such as sweeteners, colorings, flavoring agents, buffering agents and the like may be included in the formulations. Suitable sweeteners include sugar, sorbitol, saccharin, mannitol, glucose, aspartame and the like. Flavoring agents include peppermint, spearmint cinnamon, bubble gum, vanilla and the like.

The present invention has been described and illustrated by the associated figures. Alternative embodiments are readily apparent to those with skill in the art without departing from the scope of the present invention.

What is claimed is:

1. A combination comprising a container for holding liquids, said container having an initial liquid level, a dispensing instrument, a retaining member such that it substantially obstructs said opening of said container, said member including a biased passageway which enlarges to receive said dispensing instrument, and closes after removal of said dispensing instrument, said member further being positioned above the initial liquid level in said container, and a liquid containing a pharmaceutically active ingredient, wherein the pharmaceutically active ingredient is selected from the group containing ibuprofen, acetaminophen and psuedoephedrine, wherein the passageway of the retaining member expands radially to accept the dispensing instrument.

2. A combination comprising a container for holding liquids, said container having an initial liquid level, a dispensing instrument, a retaining member such that it substantially obstructs said opening of said container, said member including a biased passageway which enlarges to receive said dispensing instrument, and closes after removal of said dispensing instrument, said member further being positioned above the initial liquid level in said container, and a liquid containing a pharmaceutically active ingredient, wherein the pharmaceutically active ingredient is selected from the group containing ibuprofen, acetaminophen and psuedoephedrine, wherein the retaining member is resilient and has a slitted retaining wall.

3. The container of claim 2 wherein the slitted retaining wall is conical.

4. The container of claim 2 wherein the slitted retaining wall comprises a plurality of petals.

5. The container of claim 4 wherein the slits in the petals are longitudinally oriented.

6. The container for holding liquids comprising:

a) a neck having an opening therein;

b) a shoulder integral with said neck;

c) a retaining member which substantially obstructs said opening, said retaining member including a biased passageway capable of receiving a dispensing instrument and closing after removal of a dispensing instrument; said retaining member is positioned substantially within the neck and the shoulder of the container, wherein the retaining member is resilient with a slitted conical retaining wall which closes after removal of the dispensing instrument.

7. The container of claim 6 wherein the passageway of the retaining member expands radially to accept a dispensing instrument inserted therein.

8. A container for holding liquids comprising:

a) a neck having an opening therein;

b) a shoulder integral with said neck;

c) a retaining member which substantially obstructs said opening, said retaining member including a biased passageway capable of receiving a dispensing instrument and closing after removal of a dispensing instrument; said retaining member is positioned substantially within the neck and the shoulder of the container, wherein the retaining member is resilient and has a slitted retaining wall.

9. The container of claim 8, wherein the slitted retaining wall is conical.

10. The container of claim 8, wherein the slitted retaining wall comprises a plurality of petals.

11. The container of claim 10 wherein the slits in the petals are longitudinally oriented.

* * * * *